United States Patent

Nord

[11] Patent Number: 5,563,388
[45] Date of Patent: Oct. 8, 1996

[54] CONTROL LEVER

[75] Inventor: Claes Nord, Mullsjö, Sweden

[73] Assignee: Scandmec AB, Sweden

[21] Appl. No.: 284,412

[22] PCT Filed: Feb. 3, 1993

[86] PCT No.: PCT/SE93/00083

§ 371 Date: Sep. 23, 1994

§ 102(e) Date: Sep. 23, 1994

[87] PCT Pub. No.: WO93/15341

PCT Pub. Date: Aug. 5, 1993

[30] Foreign Application Priority Data

Feb. 4, 1992 [SE] Sweden ............................. 9200298

[51] Int. Cl.[6] ........................................................ H01H 9/06
[52] U.S. Cl. ........................................ 200/61.88; 200/61.54
[58] Field of Search ........................ 200/4, 5 R, 6 R, 200/6 A, 17 R, 18, 61.27, 61.28, 61.54, 61.85, 61.88

[56] References Cited

U.S. PATENT DOCUMENTS

| 2,732,447 | 1/1956 | Findley | 200/61.54 |
| 4,183,424 | 1/1980 | Rumyantsev et al. | 192/3.58 |
| 5,285,034 | 2/1994 | Skogward et al. | 200/61.88 |

FOREIGN PATENT DOCUMENTS

| 2347227 | 11/1977 | France | B60K 41/22 |
| 2740750 | 3/1983 | Germany | B60K 41/22 |

*Primary Examiner*—Brian W. Brown
*Assistant Examiner*—Michael A. Friedhofer
*Attorney, Agent, or Firm*—Lerner, David, Littenberg, Krumholz & Mentlik

[57] ABSTRACT

A control lever which is both mechanically connected to a mechanism which is to be manoeuvred in at least two directions and electrically connected via switches (15) to electrical positioning means. The control lever comprises a knob (10) supported at its one end, which knob is movable in different directions radially with respect to the lever's longitudinal axis (22) and is provided with a cavity into which the lever (11a) projects and with a peripheral surface (12) with a space to the outer surface of the lever. The space on the one hand presents at least one movable, ring-shaped electrical contact element as part of the switch, said element being connected with the knob and arranged to accompany this in its radial movements, and on the other hand also presenting an elastic, ring-shaped centring element (14) which lies with its one periphery against said peripheral surface of the cavity and with its other periphery against the lever. The centring element (14) strives to centre the contact element relative to the lever, whereby a manual sideways movement of the knob relative to the lever in any of said different directions displaces the ring-shaped contact element radially into one of several different contact positions in contact with the second contact element which is formed by the outside of the lever. The ring-shaped contact element (15) comprises at least one elastic distance piece (21) which is supported against the cavity's peripheral surface (12). The lever's movement inside the cavity is limited by abutment surfaces (13, 18) in such a way that the ring-shaped contact element (15) presents a residual mobility when the lever has reached the abutment surfaces.

4 Claims, 3 Drawing Sheets

CONTROL LEVER

TECHNICAL FIELD

The present invention relates to a control lever which is both mechanically connected to a mechanism which is to be manoeuvred in at least two directions and electrically connected via switches to electrical positioning means, comprising a knob supported at its one end, which knob is movable in different directions radially with respect to the lever's longitudinal axis and is provided with a cavity into which the lever projects and with a peripheral surface which defines a space to the outer surface of the lever, said space on the one hand presenting at least one movable, ring-shaped electrical contact element as part of the switch, said element being connected with the knob and arranged to accompany this in its radial movements, and on the other hand also presenting an elastic, ring-shaped centring element which lies with its one periphery against said peripheral surface of the cavity and with its other periphery against the lever, whereby the centring element strives to centre the contact element relative to the lever, and whereby a manual sideways movement of the knob relative to the lever in any of said different directions displaces the ring-shaped contact element radially into one of several different contact positions in contact with the second contact element which is formed by the outside of the lever.

BACKGROUND ART

A control lever of the above mentioned type is known from WO 91/02912, which lever has been used as a gear change lever in combination with an electrically operated clutch. The arrangement has adequately fulfilled the requirements for sensitivity and precision which have to be met in order to achieve good operation. The arrangement makes it noticeably simpler to drive a car with a manual gearbox since the clutch does not have to be operated by foot, but instead is directly integrated with the gear change lever.

It has however shown itself to be difficult to produce a control lever which fulfils the demands for feel and precision with normal gearchanging forces of 20–30N and at the same time meet the durability requirements for a maximum load of 1000N without deformation damage to the electrical contacts. A designer for this type of control must additionally take account of the ergonomic requirement and demand for good design.

TECHNICAL PROBLEM

An object of the invention is therefore to achieve a control lever according to the preamble which can endure high stresses in all directions without the risk of deformation to the contact surfaces and which can offer sensitivity and precision during normal use.

SUMMARY OF THE INVENTION

Said object is achieved in that the ring-shaped contact element comprises at least one elastic distance piece which is supported against the cavity's peripheral surface, and in that the lever's movability inside the cavity is limited by abutment surfaces in such a way that the ring-shaped contact element presents a residual movability when the lever has reached the abutment surfaces.

Preferred embodiments of the invention are defined in the dependent claims.

DESCRIPTION OF THE DRAWINGS

An embodiment will now be described in more detail with reference to the accompanying drawings in which.

DESCRIPTION OF PREFERRED EMBODIMENTS

Figure 1:
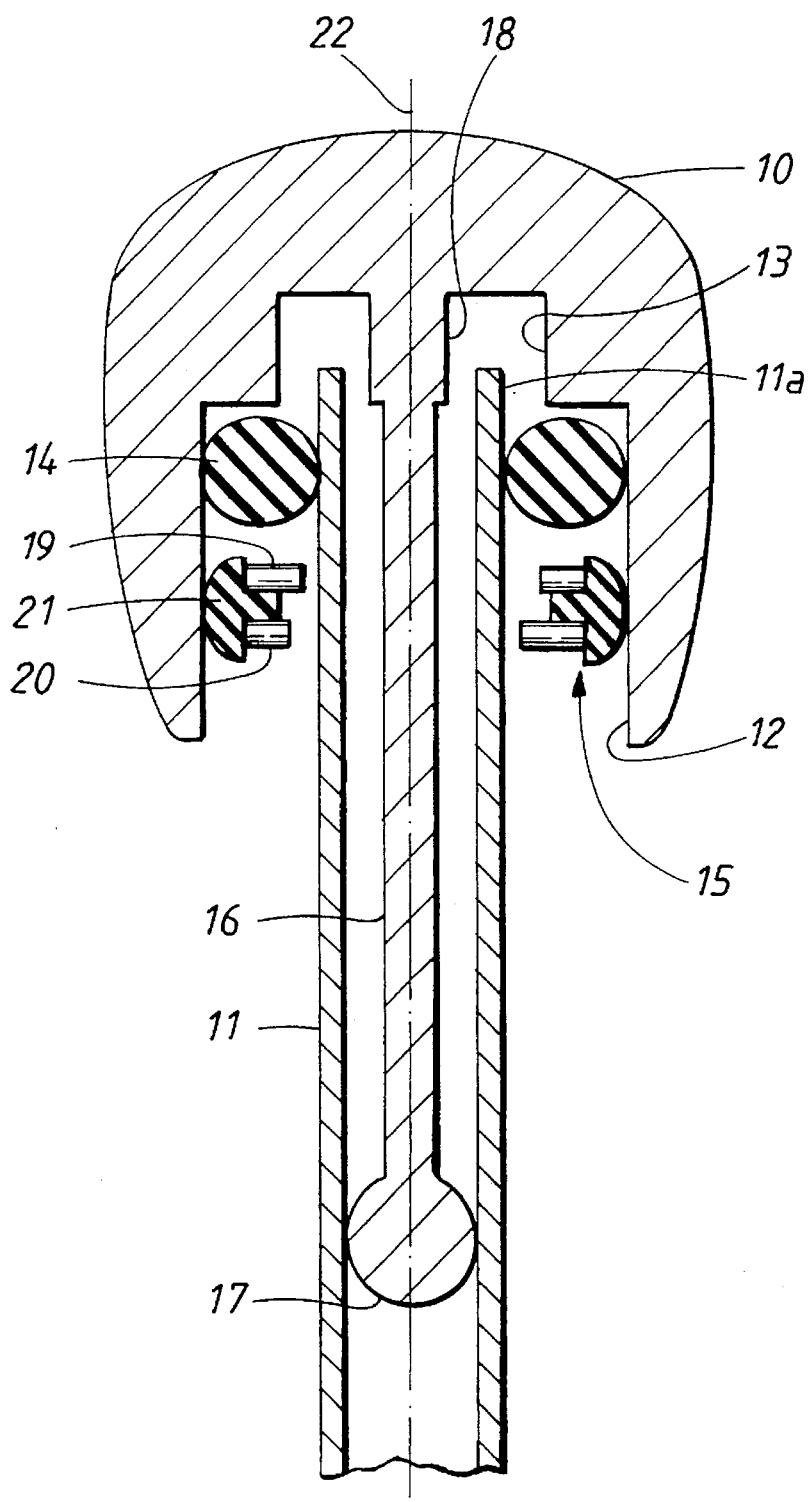
FIG. 1 shows schematically the upper parts of a control lever according to the invention in a rest position, FIG. 2 correspondingly shows the control lever in a normal operating position.
Figure 2:
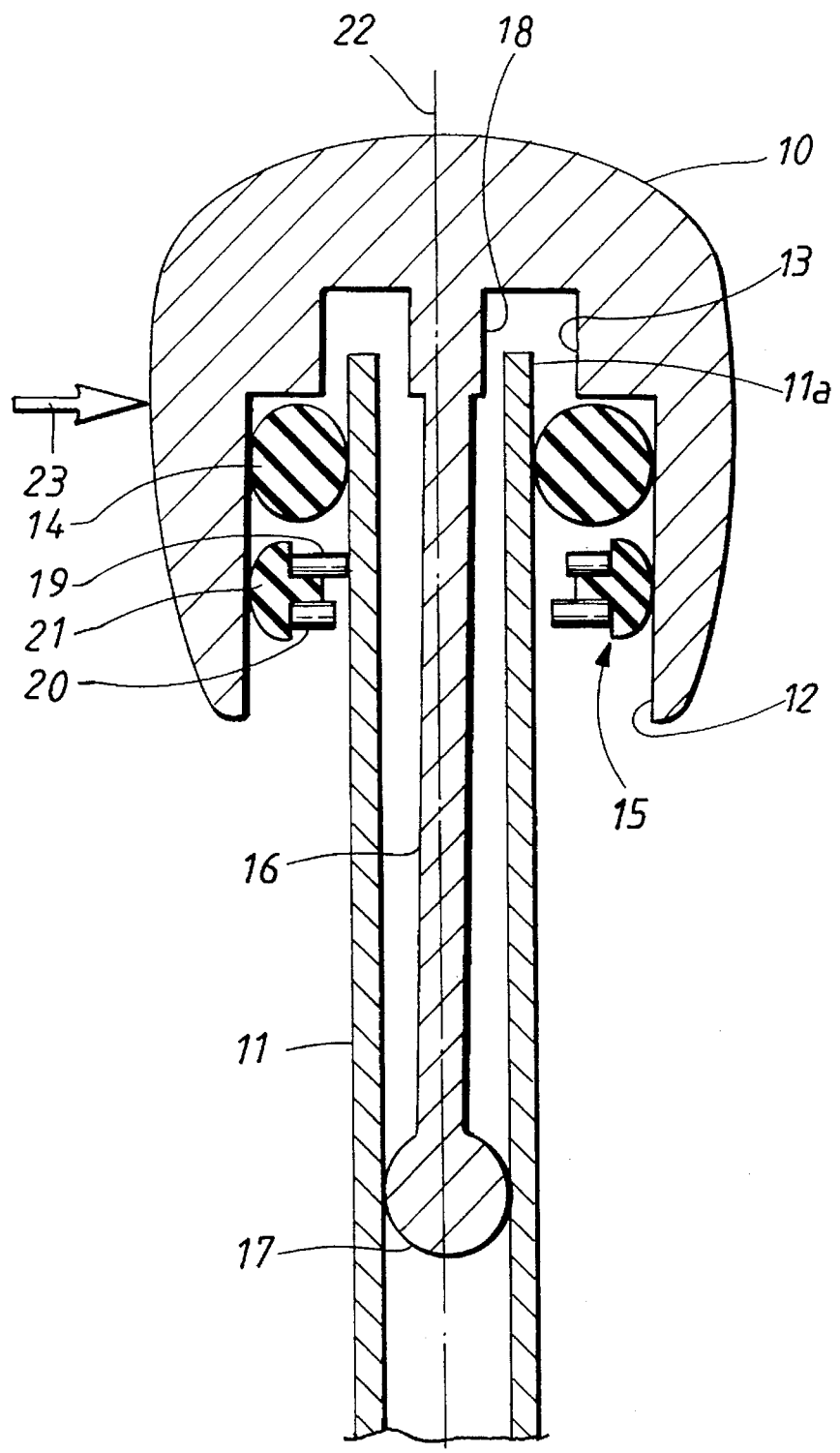
Figure 3:
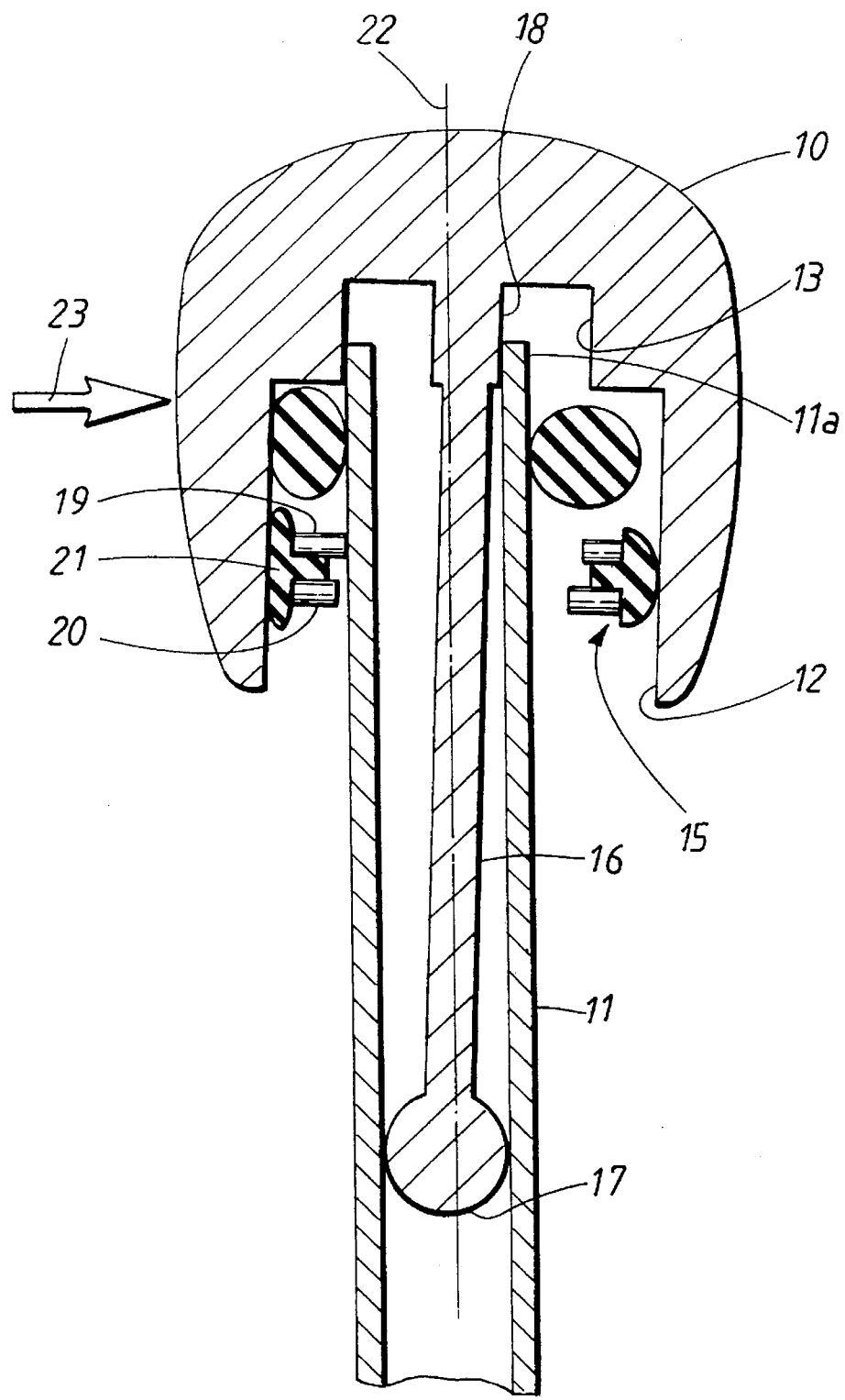
FIG. 3 shows, similarly, the control lever in an extreme position of operation.

The control lever according to the invention shown in FIGS. 1–3 is known in its basic form from WO 91/02912 and will be described relatively basically hereafter, since the operating principles and the different embodiments are already described in detail in said publication.

Basically the control lever is used to achieve, in one and the same movement, a mechanical shifting of a mechanism, e.g. a manual gearbox in a vehicle, as well as an electrical operation of for example an electrically operated clutch between the vehicle's engine and said gearbox.

As clear from the figures, the control lever comprises a knob 10 and a substantially elongated lever arm 11 of which only the upper portion is shown in the drawings. The lever arm carries at its upper end the knob 10 and is, at its lower end, coupled to the mechanism which is to be operated or to transfer the operating movement, which is a swinging movement, for which reason the movement of the knob occurs substantially in a sideways direction, i.e. perpendicular to the lever arm's longitudinal axis.

The lever arm 11 consists of a cylindrical tube which projects into a cylindrical cavity of the knob 10 with its opening facing downwards and which has an inwardly facing peripheral cylindrical surface 12. The lever arm's end portion 11a projects into an inner cylindrically formed portion of said cavity with smaller diameter and an inwardly facing cylindrical peripheral surface 13 which normally presents a ring-shaped space to the outwardly facing peripheral surface of the end portion 11a.

In the space between the tube 11 and the peripheral surface 12 there is fitted firstly an elastically centring element 14 of highly elastic material such as silicon in the form of an O-ring which has the task of centring the knob 10 relative to the lever tube 11, and secondly a ring-shaped electrical contact element.

The knob presents a central shaft 16 with an articulation ball at its lower end 17, said shaft projecting into the lever arm's 11 elongated cylindrical cavity. The articulation ball 17 has such a diameter and such a fit in the cylindrical cavity that a small swinging movement of the shaft 16 is permitted with the articulation ball acting as the articulation centre. At its top, the shaft presents a widened portion with a peripheral surface 18.

The contact element 15 forms the moving part of an electric switch which is included as part of a circuit comprising an electrical conductor (not shown) and the lever arm's electrically conducting peripheral surface.

The switch comprises two ring-shaped contact segments 19, 20 which are located at different levels along the lever arm and are held electrically separated from each other by means of holder 21 made of an elastic material. In the example shown, two different contact positions are obtained depending on whether the control lever is moved to the left or to the right in the figures, as a result of the ring segments being asymmetrically formed.

In the rest position as shown in FIG. 1 the knob 10 and the shaft 16 are parallel with the centreline 22 of the shaft 11.

Using a normal manoeuvring force as indicated by the arrow 23 in FIG. 2 the knob is tipped with respect to the articulation ball 17 whilst compressing the centring ring's 14 left part. As a result, the ring segment 19 is brought into contact with the lever's peripheral surface for closing an electrical circuit.

On using a significantly higher manoeuvring force as indicated by the arrow 24 in FIG. 3, such as would correspond to a forced shifting movement, the knob 10 is tipped additionally several degrees about the articulation ball 17 whereby the left part of the centring ring 14 is compressed further. In this way the left part of the elastic holder 21 is also compressed, without the contact pressure between the ring segment and the lever tube exceeding a predetermined value. In this position the knob's surfaces 13 and 18 form abutment surfaces which prevent additional movement in the same direction.

It is preferable if the elastic distance piece 21 is comparatively stiffer than the elastic element 14.

The invention is not limited to the embodiment described above and shown in the drawings but can be varied in many ways within the scope of the appended claims. For example the lever 11 need not be tube-shaped nor enclose a central shaft 16 adjoined with the knob and having an articulation ball 17. Alternatively the articulation can be achieved on the outside of a solid shift lever rod.

What is claimed is:

1. A control lever for mechanically operating a movable mechanism and for electrically operating an electrical positioning means, said control lever comprising a lever arm having a first end and a longitudinal axis, a knob supported at said first end of said lever arm including a cavity having a peripheral surface, said first end of said lever arm projecting into said cavity thereby providing a space between said peripheral surface of said cavity and said lever arm, said knob being radially movable in a plurality of directions with respect to said longitudinal axis of said lever arm, a ring-shaped electrical contact member acting as a switch for contacting said lever arm disposed in said space, and an annular elastic centering member disposed in said space between said peripheral surface of said cavity and said lever arm for centering said ring-shaped electrical contact member with respect to said lever arm, said ring-shaped electrical contact member comprising at least one elastic spacer supported against said peripheral surface of said cavity and being movable with said knob, whereby movement of said knob relative to said lever arm in any one of said plurality of directions causes corresponding displacement of said ring-shaped electrical contact member into one of a plurality of contact positions with respect to said lever arm, said cavity in said knob including a pair of abutment surfaces limiting the relative movement of said knob with respect to said lever arm whereby said ring-shaped electrical contact member maintains residual mobility with respect to said lever arm when said lever arm is in contact with either of said pair of abutment surfaces.

2. A control lever as claimed in claim 1 wherein said elastic spacer is comparatively stiffer than said annular elastic centering member.

3. A control lever as claimed in claim 1 or 2, in which said ring-shaped electrical contact member comprises at least two ring-shaped electrical contact elements for contacting said lever arm.

4. A control lever as claimed in claim 3, wherein said at least two ring-shaped electrical contact elements are located at different levels along said longitudinal axis and held electrically separate from each other by said at least one elastic spacer.

* * * * *